US012567204B2

(12) United States Patent
Li et al.

(10) Patent No.: US 12,567,204 B2
(45) Date of Patent: Mar. 3, 2026

(54) MODEL RECONSTRUCTION METHOD, MODEL PROCESSING METHOD AND APPARATUS, DEVICE, SYSTEM, AND MEDIUM

(71) Applicant: BOE Technology Group Co., Ltd., Beijing (CN)

(72) Inventors: Kaiyu Li, Beijing (CN); Jing Liao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 243 days.

(21) Appl. No.: 18/458,174

(22) Filed: Aug. 30, 2023

(65) Prior Publication Data

US 2024/0242430 A1     Jul. 18, 2024

(30) Foreign Application Priority Data

Jan. 12, 2023     (CN) ......................... 202310066443.X

(51) Int. Cl.
| | |
|---|---|
| *G06V 40/00* | (2022.01) |
| *G06T 5/50* | (2006.01) |
| *G06T 7/73* | (2017.01) |
| *G06T 13/40* | (2011.01) |
| *G06T 17/00* | (2006.01) |
| *G06T 19/20* | (2011.01) |
| *G06V 40/10* | (2022.01) |
| *G06V 40/16* | (2022.01) |

(52) U.S. Cl.
CPC ............... *G06T 17/00* (2013.01); *G06T 5/50* (2013.01); *G06T 7/73* (2017.01); *G06T 13/40* (2013.01); *G06T 19/20* (2013.01); *G06V 40/103* (2022.01); *G06V 40/168* (2022.01); *G06V 40/174* (2022.01); *G06T 2207/20221* (2013.01)

(58) Field of Classification Search
None
See application file for complete search history.

(56) References Cited

U.S. PATENT DOCUMENTS

| | | | |
|---|---|---|---|
| 2013/0342527 A1 | 12/2013 | Molyneaux et al. | |
| 2016/0314619 A1 | 10/2016 | Luo et al. | |
| 2017/0018117 A1* | 1/2017 | Chen ....................... | G06T 19/20 |

(Continued)

FOREIGN PATENT DOCUMENTS

| | | |
|---|---|---|
| CN | 104395929 A | 3/2015 |
| CN | 111968217 A | 11/2020 |

(Continued)

*Primary Examiner* — Martin Mushambo
(74) *Attorney, Agent, or Firm* — Ling Yu; Stephen Yang; Ling and Yang Intellectual Property

(57)     ABSTRACT

Disclosed are a model reconstruction method, a model processing method and apparatus, a device, a system, and a medium. The model reconstruction method includes: acquiring a human body image; generating a first three-dimensional facial model based on a first partial image in the human body image and generating a three-dimensional body model, wherein the first partial image includes facial features; preprocessing the first three-dimensional facial model and obtaining a second three-dimensional facial model based on a preprocessing result; and splicing the second three-dimensional facial model and the three-dimensional body model to obtain a spliced three-dimensional human body model.

19 Claims, 8 Drawing Sheets

(56) References Cited

U.S. PATENT DOCUMENTS

2019/0362529 A1* 11/2019 Wedig ..................... G06T 13/40
2022/0392251 A1* 12/2022 Zhang ..................... G06T 19/20

FOREIGN PATENT DOCUMENTS

| | | |
|---|---|---|
| CN | 112437950 A | 3/2021 |
| CN | 113496507 A | 10/2021 |
| CN | 114219001 A | 3/2022 |

* cited by examiner

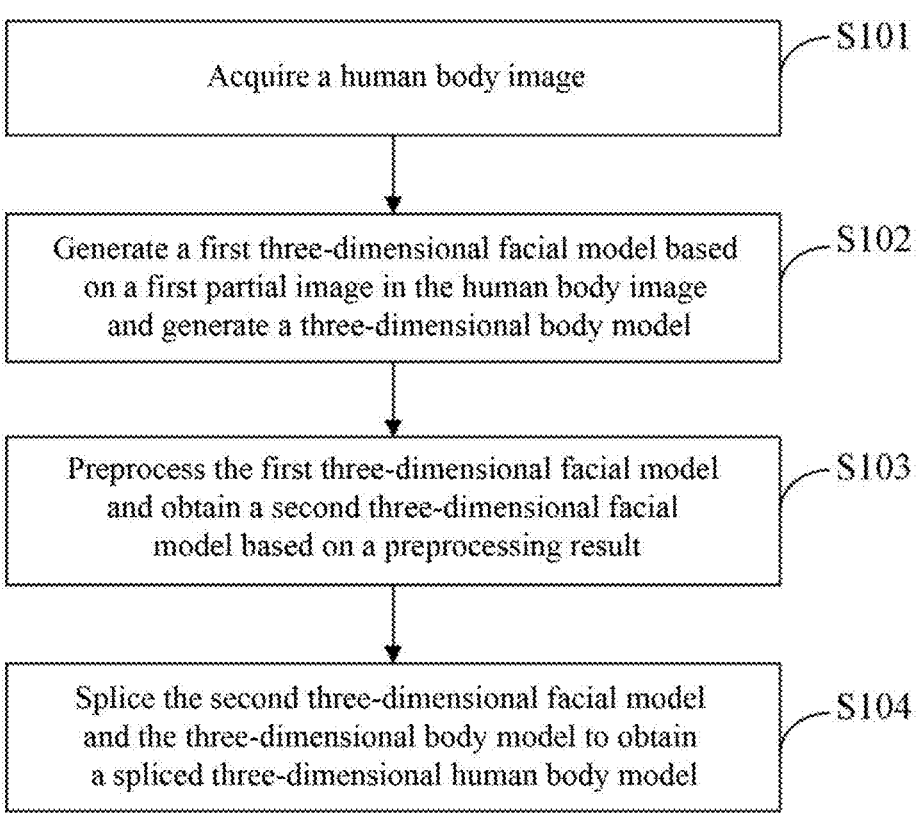

Acquire a human body image ⎯ S101

Generate a first three-dimensional facial model based on a first partial image in the human body image and generate a three-dimensional body model ⎯ S102

Preprocess the first three-dimensional facial model and obtain a second three-dimensional facial model based on a preprocessing result ⎯ S103

Splice the second three-dimensional facial model and the three-dimensional body model to obtain a spliced three-dimensional human body model ⎯ S104

FIG. 1

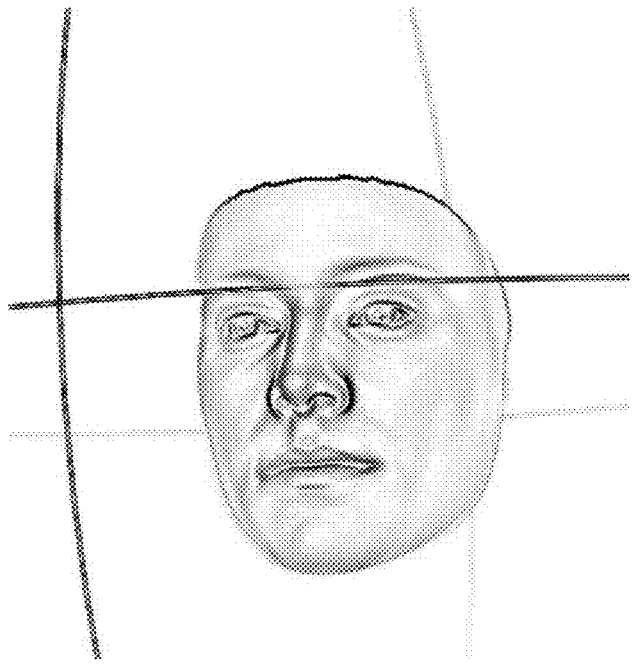

FIG. 2

Second facial
feature point

Second facial
feature point
after deformation

Second facial
feature point
before
deformation

Side view
effect of a
black-and-white
control chart

Front view
effect of the
black-and-white
control chart

MODEL RECONSTRUCTION METHOD, MODEL PROCESSING METHOD AND APPARATUS, DEVICE, SYSTEM, AND MEDIUM

CROSS-REFERENCE TO RELATED APPLICATION

The present application claims priority to Chinese Patent Application No. 202310066443.X filed to the CNIPA on Jan. 12, 2023, contents of which are hereby incorporated by reference.

TECHNICAL FIELD

Embodiments of the present disclosure relate to, but are not limited to, the technical field of virtual image generation, in particular to a model reconstruction method, a model processing method and apparatus, a device, a system, and a medium.

BACKGROUND

Virtual image generation has for a long time been categorized into two different fields: mass entertainment and 3D Computer Graphics (3DCG). In the field of mass entertainment, most of virtual image creation is based on a set of preset character image sets of game developers for selection and combination. In the field of 3DCG, high-precision human body models are established for performers according to actual needs, which may restore characteristics and artistic effects of characters themselves to a greater extent. However, a virtual image generated by a current virtual image generation technology is mostly obtained by modeling a face, and research on reconstruction of a full-body model lacks more progress.

SUMMARY

The following is a summary of subject matters described in the present disclosure in detail. The summary is not intended to limit the protection scope of claims.

The embodiments of the present disclosure provide a model reconstruction method, a model processing method and apparatus, a device, a system, and a medium. Technical solutions are as follows.

An embodiment of the present disclosure provides a model reconstruction method, which includes: acquiring a human body image; generating a first three-dimensional facial model based on a first partial image in the human body image and generating a three-dimensional body model; wherein the first partial image includes facial features; preprocessing the first three-dimensional facial model and obtaining a second three-dimensional facial model based on a preprocessing result; and splicing the second three-dimensional facial model and the three-dimensional body model to obtain a spliced three-dimensional human body model.

An embodiment of the present disclosure also provides a model processing method, which includes: performing animation editing on a three-dimensional human body model; wherein the three-dimensional human body model may be reconstructed by any of the aforementioned model reconstruction methods.

An embodiment of the present disclosure also provides a model reconstruction apparatus including at least one processor, wherein the processor is configured to execute an image acquisition module, a model generation module, a preprocessing module, and a splicing module, wherein the image acquisition module is configured to acquire a human body image; the model generation module is configured to generate a first three-dimensional facial model based on a first partial image in the human body image and generate a three-dimensional body model; wherein the first partial image includes facial features; the preprocessing module is configured to preprocess the first three-dimensional facial model and obtain a second three-dimensional facial model based on a preprocessing result; the splicing module is configured to splice the second three-dimensional facial model and the three-dimensional body model to obtain a spliced three-dimensional body model.

An embodiment of the present disclosure also provides a model processing apparatus including: any model reconstruction apparatus described above, wherein the at least one processor is further configured to execute an animation editing module, wherein the animation editing module is configured to perform animation editing on the three-dimensional human body model.

An embodiment of the present disclosure also provides a model reconstruction device including: a memory and a processor, a computer program is stored in the memory, and the computer program is loaded and executed by the processor to implement any model reconstruction method described above.

An embodiment of the present disclosure also provides a model processing device including: a memory and a processor, a computer program is stored in the memory, and the computer program is loaded and executed by the processor to implement any model processing method described above.

An embodiment of the present disclosure also provides an interactive system, which includes: any model reconstruction device described above and any model processing device described above; the model processing device is communicatively connected with the model reconstruction device; the model processing device is provided with a three-dimensional engine, and the model processing device executes any model processing method described above by invoking the three-dimensional engine.

An embodiment of the present disclosure also provides a non-transitory computer-readable storage medium, on which a computer program is stored, when the computer program is executed by a processor, any method described above is implemented.

Other aspects may be understood upon reading and understanding accompanying drawings and detailed description.

BRIEF DESCRIPTION OF THE DRAWINGS

In the accompanying drawings, unless otherwise specified, same reference numerals throughout a plurality of drawings indicate same or similar components or elements. These drawings may not be drawn to scale. It should be understood that these drawings depict only some implementation modes disclosed according to the present disclosure and should not be considered as limiting the scope of the present disclosure.

FIG. 1 is a schematic diagram of a flow of a model reconstruction method provided by an embodiment of the present disclosure.

FIG. 2 is a schematic diagram of a first three-dimensional facial model in an embodiment of the present disclosure.

DETAILED DESCRIPTION

Figure 3:
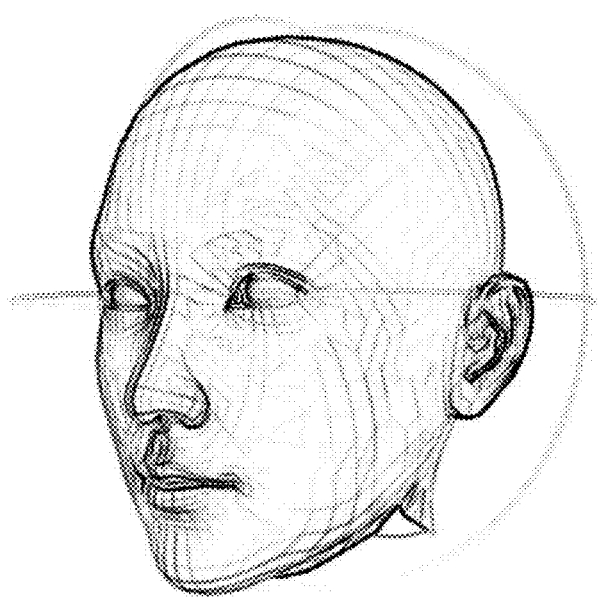
FIG. 3 is a schematic diagram of a base facial model in an embodiment of the present disclosure.

Specific implementation modes of the present disclosure will be described further in detail below with reference to the accompanying drawings and embodiments. Following embodiments are intended to illustrate the present disclosure, but are not intended to limit the scope of the present disclosure. The embodiments in the present disclosure and features in the embodiments may be combined randomly with each other if there is no conflict.

Hereinafter, only some exemplary embodiments are briefly described. As will be recognized by those skilled in the art, the described embodiments may be modified in a plurality of different ways without departing from the spirit or scope of the present disclosure. Therefore, the drawings and description are considered to be exemplary in nature and not restrictive.

First, several terms related to the embodiments of the present disclosure are introduced.

Virtual image: refers to a kind of character image in virtual space that may represent and display characteristics of human image generated through artistic creation or three-dimensional modeling design. This image will more or less show a certain degree of characteristics or tendency of the mental field of a creator himself. With development of 3DCG technologies and computer hardware level, when using an entertainment product on the Internet, a user will more or less establish a virtual image, that may represent himself or herself, as a port to communicate with the outside world in the virtual world, including but not limited to a character avatar, a game character model, and another image.

Three-dimensional human body model: a three-dimensional model is a data format generated and established by using three-dimensional modeling software or through a scanning device, which is used for describing coordinate positions of surface points of an object in three-dimensional space; it may be rendered and displayed in graphic rendering software, including a variety of rendering manners such as offline rendering and real-time rendering; it may express information such as surface shape, color, and illumination of an object in three-dimensional vision, and generally consists of mesh data and texture data. A three-dimensional model for displaying a human body is a three-dimensional human body model.

Facial reconstruction: a process of generating and establishing a three-dimensional facial model by using three-dimensional modeling software or through a scanning device, which is embodied in a process of capturing a structure of the three-dimensional facial model and a process of capturing appearance of a three-dimensional facial model object. The process includes construction of the three-dimensional facial model, as well as construction of a material of the object, color, and information related to it and appearance of the object itself. A facial reconstruction technology referred to in the specification may focus on a facial reconstruction technology of a monocular camera, and a three-dimensional facial model may be obtained from a single photograph through neural network calculation.

Skin weight: that is, skin and weight. Skin refers to a technology of bonding a model to a bone, and weight refers to a degree of an influence of a skinned bone on joint points of the model.

Radial Basis Function (RBF): a real-valued function whose value depends only on a distance from an origin, i.e., $\Phi(x)=\Phi(|x|)$, or it may also be a distance to any point c, the point c is called a center point, i.e., $\Phi(x, c)=\Phi(|x-c|)$, wherein c is the center point. Any function $\Phi$ satisfying characteristics of $\Phi(x)=\Phi(|x|)$ is called a radial basis function, and the standard one generally uses Euclidean distance (also called Euclidean radial basis function). A main function of radial basis function in the specification is to predict changes of most other parameters of a system from through changes of a few parameters.

Non-actinic processing: refers to the processing performed on a model map, the model map is converted from an image acquired under ambient illumination of the natural environment. Non-actinic processing may remove highlights and shadows in the model map, thus eliminating an influence of ambient illumination on the model map and obtaining a model map without the influence of ambient illumination.

Black-and-white control chart: a two-dimensional black-and-white control map made on a three-dimensional model by using UV coordinates (coordinates in a two-dimensional coordinate system, with U and V representing two directions). UV coordinates represent position information of each point in an image, and these points are interrelated with the three-dimensional model and may determine a position of an edge texture map.

Vertex color: in 3D rendering, more information may be attached to each vertex, which is equivalent to a memory, which may store color information of a black-and-white control chart.

In terms of facial modeling of a virtual image generation technology, a three-dimensional facial reconstruction technology has been a research hotspot in the fields of computer vision and optical imaging for a long time, and has a wide and far-reaching application prospect in directions of face recognition, video editing, and virtual makeup.

At present, there is a reconstruction method of a three-dimensional facial model, which is based on a 3D Morphable Model (3DMM) of a statistical model. There are some further researches based on a 3DMM technology. For example, aiming for a phenomenon of semantic inconsistency which usually occurs before and after conversion from a non-frontal facial image to a frontal image, i.e., a phenomenon of local region distortion, a facial posture correction method based on the 3DMM has been proposed. Through this method, a natural frontal facial image may be generated, and then a two-dimensional facial image is standardized according to a two-dimensional posture correction method. Texture of a self-occlusion region of a face is reconstructed by using illumination information and symmetric texture. Then corresponding three-dimensional facial texture is acquired from the standardized two-dimensional facial image according to a point correspondence between 2D and 3D, and a three-dimensional facial reconstruction result is finally obtained by combining a facial shape and texture information.

However, a facial model generated based on the aforementioned 3DMM technology is only limited to a simple facial slice model, which has a high and fixed number of faces, is not easy to change, is difficult to interact with a conventional engine, is difficult to combine with three-dimensional art production, and is difficult to integrate with a body model.

Technical solutions of the present disclosure will be described below in detail with specific embodiments.

An embodiment of the present disclosure provides a model reconstruction method, which may be applied to a model reconstruction device, as shown in FIG. 1. The method includes following acts S101 to S104.

S101, acquiring a human body image.

S102, generating a first three-dimensional facial model based on a first partial image in the human body image, and generating a three-dimensional body model.

S103, preprocessing the first three-dimensional facial model, and obtaining a second three-dimensional facial model based on a preprocessing result.

S104, splicing the second three-dimensional facial model and the three-dimensional body model to obtain a spliced three-dimensional human body model.

The aforementioned model reconstruction device may be a device of a server-side, so that reconstruction of the three-dimensional human body model may be achieved at the server-side.

The aforementioned human body image may be a two-dimensional single-angle human body image captured by an image acquisition apparatus in a natural environment, such as a two-dimensional frontal human body image, or may be a two-dimensional single-angle human body image provided by a user, the human body image may include at least facial features. In some examples, the human body image may include full-body features, which may include facial features and body features. The facial features may include features of the whole face, including a face shape, five sense organs, and so on, and the body features may include features of other body parts other than the face, such as features of a trunk, limbs, and other body parts other than the face.

The aforementioned human body image may include at least a first partial image, and the first partial image may be a facial image including facial features. The first partial image may be a human body image itself when the human body image is an image including facial features, and the first partial image may be a part of the human body image when the human body image is an image including full-body features.

In one example, based on the first partial image, the aforementioned human body image may further include a second partial image. The second partial image may be a full-body image including full-body features or a body image including body features. The full-body image may be the human body image itself when the human body image is an image including full-body features. The body image may be a part of the human body image.

When the human body image includes the first partial image and the second partial image at the same time, the first partial image and the second partial image may be obtained through image segmentation of the human body image. A resolution of the aforementioned human body image may be set according to actual needs, for example, it may be 256*256*3.

According to the model reconstruction method provided by the embodiment of the present disclosure, a face may be modeled to obtain a second three-dimensional facial model, and a body may be modeled to obtain a three-dimensional body model. By splicing the second three-dimensional facial model and the body model, a relatively complete three-dimensional human body model reflecting facial features and body features may be obtained. The second three-dimensional facial model in the embodiment of the present disclosure is generated based on the first partial image of the human body image, and a matching degree between the second three-dimensional facial model and the facial features of the human body image is relatively high, thereby satisfying requirements of personalized modeling for the facial features. A process of generating the second three-dimensional facial model from the first partial image may convert two-dimensional information into richer three-dimensional coding information, thereby obtaining a more accurate three-dimensional facial model. The second three-dimensional facial model in the embodiment of the present disclosure may be obtained by preprocessing the first three-dimensional facial model, and the preprocessing may improve flexibility of the three-dimensional facial model to meet needs of practical application scenarios, such as making it easier for the three-dimensional facial model to interact with a conventional 3D engine, so as to achieve subsequent art production, editing, and other processes.

In an exemplary implementation mode, the facial features include anatomical structural features and in vitro structural features of the face, and the body features include anatomical structural features and in vitro structural features of body parts. The anatomical structural features of the face may include facial shape features, features of five sense organs, and other features. The in vitro structural features of the face may include hair, headdress, and other features. The anatomical structural features of the body may include features of tissues or organs such as trunk and limbs, while the in vitro structural features of the body may include features of non-tissues and organs such as clothes and accessories. Compared with e traditional facial features and body features, the facial features and body features in the embodiment of the present disclosure may further cover body hair, clothes, accessories, and other in vitro structural features on a basis of the anatomical structural features. The three-dimensional facial model and the three-dimensional body model obtained based on such facial features and body features have richer information, and are more matched with an image of a person in the human body image, and a more realistic virtual image may be obtained.

In an exemplary implementation mode, in the aforementioned act S102, generating the first three-dimensional facial model based on the first partial image in the human body image may include: calculating information of facial features contained in the first partial image through a least square method, solving facial feature parameters used for reconstructing the three-dimensional facial model, and generating the first three-dimensional facial model based on the facial feature parameters.

In another exemplary implementation mode, in the aforementioned act S102, generating the first three-dimensional facial model based on the first partial image in the human body image may include: extracting facial feature parameters in the first partial image through a pre-trained neural network, and generating the first three-dimensional facial model based on the facial feature parameters; wherein the facial feature parameters include facial shape parameters and facial expression parameters (or may be referred to as facial texture parameters).

The aforementioned neural network may be any one of a Convolutional Neural Network (CNN), a Deep Neural Network (DNN), and a U-net (a semantic segmentation network), etc. An input of the aforementioned neural network may be a human body image containing full-body features or a first partial image (i.e., a facial image) segmented from the human body image, and an output may be a vector expression of facial feature parameters. The aforementioned neural network may include a loss function, and the neural network may be trained based on the loss function to adjust internal parameters of the neural network. Samples used for training may include a large number of human body images (or first partial images segmented from human body images) and facial feature parameters corresponding to each human body image (or each first partial image). A human body image or a first partial image input into the neural network may be an image with background removed.

A neural network has many neuron structures, and there may be a connection relationship between neurons. By using the neural network for image processing, a processing speed is relatively fast and relatively rich facial image information may be extracted. Further, based on the relatively rich facial image information, facial feature parameters which can accurately reflect facial features in a facial image may be extracted, so that accuracy of parameter extraction may be improved, and thus a three-dimensional facial model with relatively high accuracy may be obtained. In addition, the neural network has multiple adjustable parameters internally. By adjusting the parameters, learning tasks with different complexity may be completed to meet different requirements.

In one example, a 3DMM CNN may be used, which is a regression model that may directly regress facial shape parameters and facial expression parameters of a 3DMM using a ResNet 101 network (a kind of residual network), and then generate a three-dimensional facial model based on the facial shape parameters and facial expression parameters as a first three-dimensional facial model.

In one example, the first partial image, i.e. the facial image, may be converted into a 3DMM feature parameter based on an average facial model through processing of the 3DMM CNN, and the 3DMM feature parameter may be expressed as follows.

$$S = \overline{S} + A_{id}\alpha_{id} + A_{exp}\alpha_{exp} \qquad \text{Expression (1)}$$

In the Expression (1), S is a 3DMM feature parameter, $\overline{S}$ is an average facial model obtained based on each facial model in a facial model database, $\overline{S}$ contains an average value of facial shape parameters and an average value of facial expression parameters of each facial model in the facial model database, $A_{id}\alpha_{id}$ is a facial shape parameter, wherein $A_{id}$ is an eigenvector of a covariance matrix obtained by subtracting the average value of the facial shape parameters from a shape vector of each facial model in the facial model database, $\alpha_{id}$ is an eigenvalue of the covariance matrix obtained by subtracting the average value of the facial shape parameters from the shape vector of each facial model in the facial model database, $A_{exp}\alpha_{exp}$ is a facial expression parameter, wherein $A_{exp}$ is an eigenvector of a covariance matrix obtained by subtracting the average value of the facial expression parameters from an expression vector of each facial model in the facial model database, $\alpha_{exp}$ is an eigenvalue of the covariance matrix obtained by subtracting the average value of the facial expression parameters from the expression vector of each facial model in the facial model database.

The aforementioned facial model database may be a Basel Facial Model (BFM) database, which may provide a set of bases of shape, expression, and texture, and may change an age-obesity degree of a human face according to changing parameters, wherein a shape base is a 199*n-dimensional principal component and a 199*1-dimensional principal component mean square error. A texture base and the shape base have a same dimension, and an expression base has a 100*n-dimensional principal component and a 100*1-dimensional mean square error. There are different versions of BFM database, and there are different dimensions in different versions.

Based on the 3DMM feature parameters, the 3DMM CNN may output following vectors as facial feature parameters.

$$x = (\alpha, \beta, \delta, \gamma, p) \in R^{239} \qquad \text{Expression (2)}$$

In the vector x shown in the Expression (2), $\alpha$ is a shape parameter, which may determines dimensions of an overall shape of an obtained first three-dimensional facial model, for example, it may be 80 dimensions; $\beta$ is an expression parameter, which may determine dimensions of an expression of the first three-dimensional facial model under a shape determined by the shape parameter $\alpha$, for example, it may be 64 dimensions; $\delta$ is a color parameter, which may not be used in the embodiment of the present disclosure; $\gamma$ is a 27-dimensional illumination parameter, which may be of 27 dimensions, and the illumination parameter may not be used in the embodiment of the present disclosure; p is a 6-dimensional spatial degree of freedom parameter, which includes three degrees of freedom of three axes (X axis, Y axis, and Z axis) in a spatial coordinate system where the first three-dimensional facial model is located and three degrees of freedom of rotation around the three axes; $R^{239}$ indicates that the vector x is a 239-dimensional vector.

Based on the vector of facial feature parameters represented by the aforementioned Expression (2), the first three-dimensional facial model as shown in FIG. 2 may be obtained. In an exemplary implementation mode, the first three-dimensional facial model may be a model with a color, and FIG. 2 is a concise representation without showing the color of the model.

In an exemplary implementation mode, in the act S103, preprocessing the first three-dimensional facial model and obtaining the second three-dimensional facial model based on the preprocessing result may include: identifying first facial feature points in the first three-dimensional facial model, performing deformation processing on a base facial model based on the first facial feature points, and obtaining the second three-dimensional facial model based on a result of the deformation processing.

The first facial feature points may be three-dimensional vertices corresponding to facial key parts in the first three-dimensional facial model, such as three-dimensional vertices characterizing contours of the facial key parts. The facial key parts may be, for example, eyes, a nose, a mouth, cars, and a chin. Correspondingly, a first facial feature point may be a three-dimensional vertex of a key position of each facial key part, such as a corner of an eye, a corner of the mouth, and a tip of the nose. A quantity of the first facial feature points may be multiple, and an identified first facial feature point may be labeled.

The base facial model may be a three-dimensional facial model with skin weights, the base facial model may be acquired in advance and stored in a current device, or may be acquired in real time.

Performing deformation processing on the base facial model based on the first facial feature points in the first three-dimensional facial model may make the base facial model easier to change in structure and have higher flexibility. The second three-dimensional facial model obtained on this basis is easier to interact with a conventional 3D engine, so as to achieve subsequent art production, editing, and other processes, and has a wider application range and is easier to integrate or splice with the three-dimensional body model.

In an exemplary implementation mode, the performing deformation processing on the base facial model based on the first facial feature points and obtaining the second three-dimensional facial model based on the result of the deformation processing may include: acquiring information of second facial feature points in the base facial model; determining a correlation relationship between the first facial feature points and the second facial feature points; and adjusting positions of the second facial feature points based on information of the first facial feature points and the correlation relationship, so that adjusted positions of the second facial feature points are consistent with positions of the first facial feature points, the second three-dimensional facial model may be an adjusted base facial model. Among them, the second facial feature points may be identified and labeled in the base facial model in advance, or may be identified and labeled in the base facial model in real time.

Figure 4:
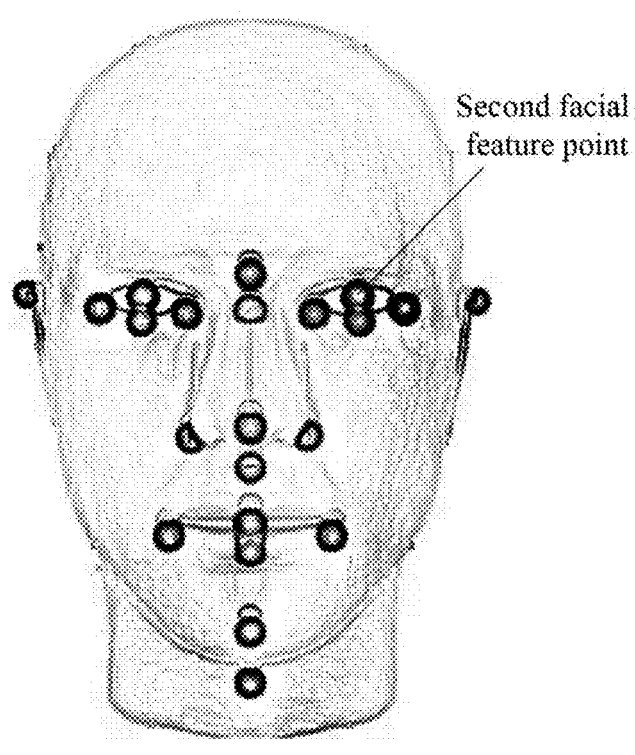
FIG. 4 is a schematic diagram of distribution of second facial feature points in an embodiment of the present disclosure.

The second facial feature points may be three-dimensional vertices corresponding to facial key parts in the base facial model, such as three-dimensional vertices characterizing contours of the facial key parts. The facial key parts may be, for example, eyes, a nose, a mouth, cars, and a chin. Correspondingly, a second facial feature point may be a three-dimensional vertex of a key position of each facial key part, such as a corner of an eye, a corner of the mouth, and a tip of the nose. A quantity of the second facial feature points may be multiple, and identified second facial feature points may be labeled. FIG. 3 shows a schematic diagram of a base facial model. After feature points are labeled on the base facial model as shown in FIG. 3, second facial feature points may be obtained. Distribution of the second facial feature points on the base facial model is shown in FIG. 4. FIG. 3 and FIG. 4 are concise representations without showing a color of the model.

Recognition of the first facial feature points and the second facial feature points may be achieved through a pre-trained feature point recognition model, an input of the feature point recognition model may be the first three-dimensional facial model or the base facial model, an output of the feature point recognition model may be labeled first facial feature points and second facial feature points, the feature point recognition model may be a neural network, a large number of images labeled with facial feature points may be used as training samples to train the feature point recognition model, and in a training process, internal parameters of the feature point recognition model may be adjusted based on a loss function in the feature point recognition model.

In the first facial feature points and the second facial feature points, each facial feature point may carry binary group information including a physical attribute and a three-dimensional coordinate position of the facial feature point, wherein the physical attribute may be a facial key part or key position characterized by the facial feature point, for example, if a facial key position characterized by a facial feature point is a corner of an eye, the corner of the eye is a physical attribute of the facial feature point.

In one example, the correlation relationship between the first facial feature points and the second facial feature points may be a correlation relationship between physical attributes, and a correlation relationship between two parts of feature points may be determined according to a corresponding relationship between physical attributes of the two parts of feature points, for example, first facial feature points and second facial feature points, which are also located at corners of eyes, are a group of feature points with a correlation relationship, and first facial feature points and second facial feature points, which are also located at a corner of a mouth, are a group of feature points with a correlation relationship. Correspondingly, adjusting the positions of the second facial feature points based on the information of the first facial feature points and the correlation relationship may include: adjusting the positions of the second facial feature points based on three-dimensional coordinate positions of the first facial feature points and a correlation relationship between physical attributes of the first facial feature points and physical attributes of the second facial feature points.

In another example, the correlation relationship between the first facial feature points and the second facial feature points may be a correlation relationship between binary group information, may include a correlation relationship between physical attributes and a correlation relationship between three-dimensional coordinate positions. A correlation relationship between physical attributes of two parts of feature points may be determined according to information of facial key parts or key positions characterized by the two parts of feature points. For example, if key positions characterized by the first facial feature points and key positions characterized by the second facial feature points are both corners of the eyes, the physical attributes of the first facial feature points and the physical attributes of the second facial feature points have a correlation relationship. It may be based on the correlation relationship between the physical attributes and further based on the correlation relationship between the three-dimensional coordinate positions of the two parts of feature points. For example, if there is a correlation relationship between the physical attributes of the first facial feature points and the physical attributes of the second facial feature points, there is also a correlation relationship between the three-dimensional coordinate positions of the first facial feature points. Correspondingly, the adjusting the positions of the second facial feature points based on the information of the first facial feature points and the correlation relationship may include: adjusting the positions of the second facial feature points based on binary group information of the first facial feature points and a correlation relationship between the binary group information of the first facial feature points and binary group information of the second facial feature points.

Based on the correlation relationship between the first facial feature points and the second facial feature points, position differences between the first facial feature points and the second facial feature points may be determined, so that shape information of a face patch in a traditional three-dimensional facial model may be transformed into one-dimensional spatial change. Based on this one-dimensional spatial change, a constructed second three-dimensional facial model may be made variable to meet interactive requirements of different 3D engines.

Figure 5:
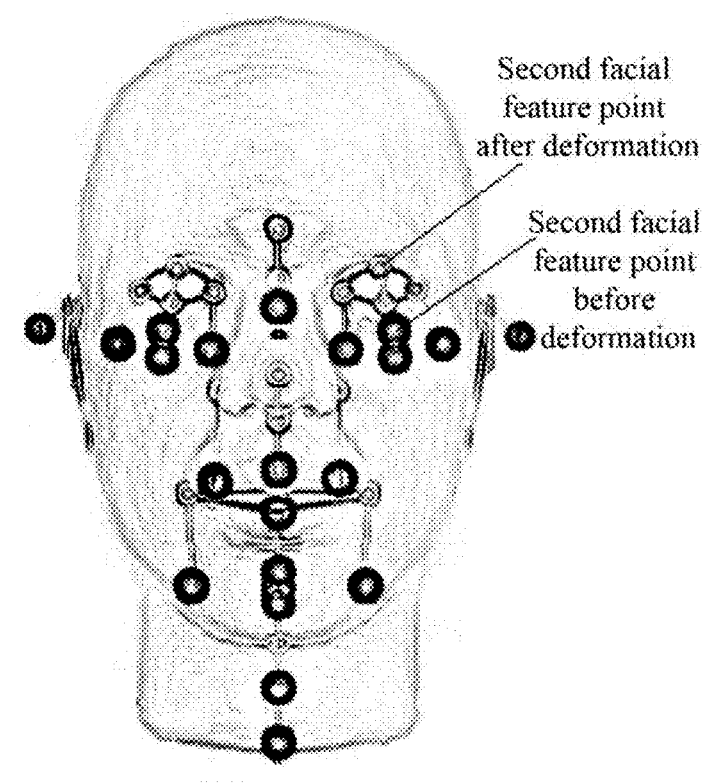
FIG. 5 is a schematic diagram of a deformed base facial model in an embodiment of the present disclosure.

After the correlation relationship between the first facial feature points and the second facial feature points is determined, deformation processing may be performed on the base facial model. After the deformation processing, a shape of the first three-dimensional facial model may be mapped into the base facial model, so that a shape of the base facial model and the shape of the first three-dimensional facial model tend to be consistent. In one example, after deforming the base facial model as shown in FIG. 4, a deformed base facial model as shown in FIG. 5 may be obtained. Relative to FIG. 4, in FIG. 5, positions of the second facial feature points are significantly changed.

The deformed base facial model is used as the second three-dimensional facial model. The second three-dimensional facial model not only has the shape of the first three-dimensional facial model, but also has skin weights of an original base facial model. The second three-dimensional facial model may be directly applied to an application end (i.e., an end that interacts with a user) without a need for further processing. The second three-dimensional facial model belongs to a kind of three-dimensional model of the application end and has better front-end applicability.

In an exemplary implementation mode, referring to the example of FIG. 4, the second facial feature points are discrete points, and correspondingly, on a basis of deformation processing based on a correlation relationship, the deformation processing on the base facial model may further include: performing smooth interpolation between each second facial feature point to obtain an interpolation result of a three-dimensional vertex between each second facial feature point, and adjusting a position of the three-dimensional vertex based on the interpolation result. Processing of the smooth interpolation may be performed synchronously in a process of adjusting the positions of the second facial feature points, and the interpolation result obtained after the processing of the smooth interpolation may be used as a target deformation position of the three-dimensional vertex, so that the three-dimensional vertex may be adjusted from its original position to the target deformation position, so deformation of the second facial feature points may be spread to other three-dimensional vertices, which makes a model structure smoother, thus improving consistency with facial features in an original facial image. Three-dimensional vertices to be deformed may be selected according to actual needs, for example, each three-dimensional vertex between each second facial feature point may be used as a three-dimensional vertex to be deformed.

The aforementioned smooth interpolation may be achieved through a radial basis function. When A target deformation position of a three-dimensional vertex is predicted, for M (positive integer) discrete second facial feature points, M radial basis functions may be constructed for interpolation to obtain M interpolation results, and an interpolation result of the three-dimensional vertex may be obtained by summing the M interpolation results. This process may be expressed as follows.

$$F(x) = \sum_{i=1}^{M} a_i g(\|X - X_i\|) \qquad \text{Expression (3)}$$

In the Expression (3), $X_i$ denotes an i-th second facial feature point among the M second facial feature points, and a value range of i is 1~M; X denotes a three-dimensional vertex to be deformed; $\|X-X_i\|$ is a distance between the three-dimensional vertex to be deformed and the i-th second facial feature point; $g(\|X-X_i\|)$ denotes a radial basis function based on $\|X-X_i\|$ and is an i-th radial basis function among M radial basis functions; F(x) denotes an interpolation result for a specified feature point; $a_i$ is a weight of the i-th radial basis function, and M radial basis functions correspond to M weights. The Expression (3) allows an interpolation result to be obtained by summing the M radial basis functions around the three-dimensional vertex to be deformed according to different weights ($a_i$).

In an example, the aforementioned Expression (3) may be transformed as follows.

$$F(x) = \sum_{i=1}^{M} a_i g(\|X - X_i\|) + c_0 + c_1 x + c_2 y + c_3 z \qquad \text{Expression (4)}$$

That is, a linear polynomial $c_0+c_1x+c_2y+c_3z$ is added on a basis of the Expression (3), wherein x is a coordinate of an x-axis of the three-dimensional vertex to be interpolated, y is a coordinate of a y-axis of the three-dimensional vertex to be interpolated, z is a coordinate of a z-axis of the three-dimensional vertex to be interpolated, and $c_0$ to $c_3$ are polynomial coefficients, and each term in this linear polynomial may represent affine transformations that cannot be accomplished solely by using radial basis functions.

In an exemplary implementation mode, the base facial model may be a three-dimensional facial model made by a user through an art engine, for example, it may be a three-dimensional facial model made through an art engine for the fields of games, medical care, and health, etc. Base facial models that meet business needs of different fields may be provided aiming for characteristics of different fields, so that a server side may carry out the aforementioned deformation processing on a basis of the provided base facial models, different base facial models may be provided aiming for different fields, and a server may carry out the aforementioned deformation processing on a basis of different base facial models, so that deformed base facial models may not only meet basic needs of relevant fields, but also reflect characteristics of an original human body image, have relatively high adaptability to different fields and have a relatively wide application range.

The above art engine may be any engine such as maya (a kind of 3D animation software), 3Dmax (another kind of 3D software), and blander (another kind of 3D animation software). A base facial model produced by the above art engine may be transmitted or stored as a file in an fpx format (an image format with multiple resolutions) or an obj format (a three-dimensional model file format), so that the server may acquire or call information of the base facial model.

The aforementioned base facial model may be a model with a specific style, such as anyone of a sci-fi style, an ancient style, and a secondary style, so that by performing deformation processing on the base facial model, a second three-dimensional facial model that not only satisfies the specific style but also conforms to the facial features of the original human body image may be obtained. Different styles of base facial models may be provided aiming for different fields, and different base facial models may be provided aiming for a same field.

In a process of performing deformation processing on the base facial model, the first three-dimensional facial model, to which the first facial feature points that the deformation depends on belongs, may be a first three-dimensional facial model obtained by processing based on a neural network. A processing principle of the neural network may be referred to previous introduction, which will not be repeated here. A first three-dimensional facial model with relatively high precision may be obtained by processing based on the neural network, so that precision of the first facial feature points labeled on the first three-dimensional facial model is also relatively high, and the second facial feature points may be finely adjusted based on the first facial feature points with relatively high precision, which is beneficial to obtain a second three-dimensional facial model with relatively high precision.

In an exemplary implementation mode, the model reconstruction method provided by the embodiment of the present disclosure may further include: generating a facial map based on the first partial image, and attaching the facial map to the second three-dimensional facial model. Adding the facial map to the second three-dimensional facial model may increase applicability of the second three-dimensional facial model and facilitate the 3D engine to directly use the model.

Figure 6:
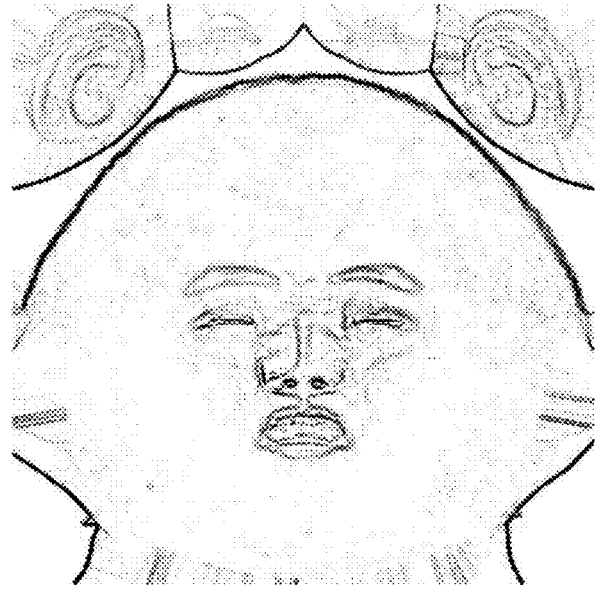
FIG. 6 is a schematic diagram of a facial map in an embodiment of the present disclosure.

In one example, a manner of generating the facial map may be a manner of UV mapping. Specifically, after generating the first three-dimensional facial model based on the first partial image, i.e., a facial image, a UV coordinate of each three-dimensional vertex of the first three-dimensional facial model may be mapped to a corresponding position point of the facial image, color information of each mapped position point is extracted, and a facial map including color information is formed based on the color information of each position point. FIG. 6 shows a facial map as an example, in which color information is omitted for concise representation.

In an exemplary implementation mode, generating the facial map based on the first partial image may include: generating an initial facial map based on the first partial image, and performing non-actinic processing on the initial facial map to remove illumination information in the initial facial map to obtain a processed facial map.

Figure 7:
FIG. 7 is a schematic diagram of an initial facial map with illumination information in an embodiment of the present disclosure.
Figure 8:
FIG. 8 is a schematic diagram of a facial map with illumination information removed in an embodiment of the present disclosure.

Human body images are usually taken in a real environment, which inevitably carries illumination information of ambient light. When generating an initial facial map based on a facial image in a human body image, illumination information of part of the facial image will be brought into the initial facial map, which will make brightness in the initial facial map uneven. For example, an initial facial map as shown in FIG. 7, due to illumination information brought in, brightness of a middle region of the face is relatively large, while brightness of checks on both sides is relatively small. This kind of facial map will affect subsequent use of a three-dimensional facial model, for example, scenes with other illumination conditions cannot be integrated during subsequent use. After illumination information in the initial facial map shown in FIG. 7 is removed through non-actinic processing, a facial map with relatively uniform brightness as shown in FIG. 8 may be obtained. In subsequent use, it is easier to set and add corresponding illumination information on this kind of facial map according to actual needs, which allows it to be integrated into scenes with different illumination conditions, and flexibility and universality in applications is stronger.

Figure 9:
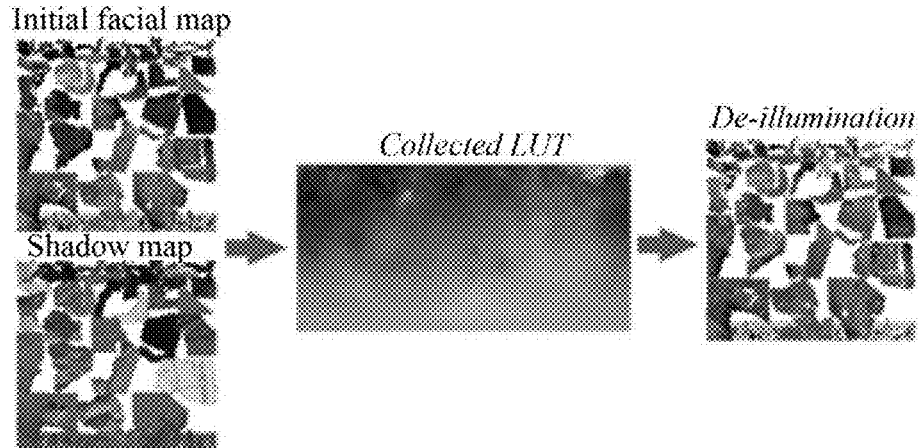
FIG. 9 is a schematic diagram of a principle of non-actinic processing in an embodiment of the present disclosure.

The aforementioned non-actinic processing may be achieved through a de-illumination tool. Referring to FIG. 9, a specific principle thereof is to generate a shadow map based on an initial facial map, determine a shadow portion on the initial facial map, i.e., a darker portion occluded by ambient light, based on the shadow map, determine a non-shadow portion on the initial facial map (i.e., a portion other than the shadow portion) based on the shadow portion, calculate a brightness average value of each position point of the non-shadow portion on the initial facial map, calculate a difference between a brightness value and the brightness average value of each position point on the initial facial map (hereinafter referred to as a brightness difference), collect position information (e.g., longitude and latitude coordinates of a normal line) and the brightness difference of each position point into an ambient illumination Lookup Table (LUT) (a color lookup table), complete a collection process of the LUT, query the brightness difference of each position point from the LUT during the non-actinic processing, adjust brightness of each position point based on the queried brightness difference, for a brighter position point, decrease a brightness value thereof according to the brightness difference, and for a darker position point, increase a brightness value thereof according to the brightness difference. The collection process of the LUT may be executed for many times, so that collected brightness difference data is more accurate, and then an effect of the non-actinic processing is better. The aforementioned shadow map may include a world normal line map, a visibility normal line map, and an ambient light shading map, and these three maps contain shadow information from different angles.

In an exemplary implementation mode, in the aforementioned act S102, generating the three-dimensional body model may include: calculating information of full-body features or body features contained in the second partial image through a least square method, solving facial feature parameters for reconstructing the three-dimensional body model, and generating the three-dimensional body model based on the body feature parameters. The body feature parameters may be parameters which reflect the full-body features, or may be parameters which reflect the body features.

In an exemplary implementation mode, in the aforementioned act S102, generating the three-dimensional body model may include: extracting body feature parameters in the second partial image through a pre-trained neural network, and generating the three-dimensional body model based on the body feature parameters. Herein, the second partial image may include full-body features or body features, the body feature parameters may include body shape parameters and body posture parameters, and the body feature parameters may be parameters reflecting the full-body features or parameters reflecting the body features.

The neural network may be any one of a CNN, a Deep Neural Network (DNN), and a U-net, etc. A neural network used for generating the first three-dimensional facial model and a neural network used for generating the three-dimensional body model may be the same or different. An input of the neural network used for extracting body feature parameters may be a human body image containing full-body features or a second partial image segmented from the human body image (i.e., a body image or a full-body image), and its output may be a vector expression of body feature parameters. A neural network used for extracting body feature parameters may include a loss function. Based on the loss function, this neural network may be trained to adjust internal parameters of the neural network. Samples used for training may include a large number of human body images (or second partial images segmented from human body images) and body feature parameters corresponding to each human body image.

A neural network has many neuron structures, and there may be a connection relationship between neurons. By utilizing a neural network for image processing, a processing speed is relatively fast and relatively rich body image information may be extracted. Based on relatively rich facial image information, body feature parameters that can accurately reflect body features in the body image may be extracted, so that accuracy of parameter extraction may be improved, and thus a three-dimensional body model with relatively high accuracy may be obtained. In addition, the neural network has multiple adjustable parameters internally, and by adjusting the parameters, learning tasks with different complexity may be completed to meet different requirements.

The body feature parameters extracted by the neural network may be feature parameters of a Skinned Multi-Person Linear (SMPL) human body model, and correspondingly, the generated three-dimensional body model may be a SMPL human body model. The SMPL human body model is a parameterized human body model. According to a construction method of the SMPL human body model, arbitrary human modeling and animation driving may be performed, bump and depression of human muscles in a process of limb movement may be simulated, thus surface distortion of a human body in a process of movement may be avoided, and morphology of human muscle stretching and contraction movement may be accurately depicted.

Figure 10:
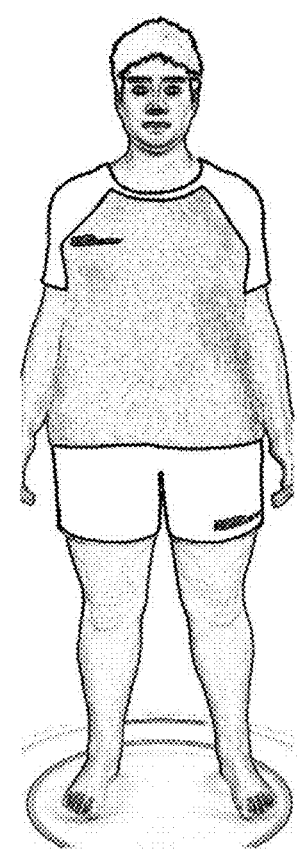
FIG. 10 is a schematic diagram of a Skinned Multi-Person Linear (SMPL) human body model in an embodiment of the present disclosure.

When generating the SMPL human body model, input parameters of the neural network may be body shape parameters and body posture parameters, the body shape parameters may include 10 parameters of tallness and shortness, fatness and thinness, and a ratio such as a head-to-body ratio of a human body, and the body posture parameters may include 75 parameters of overall movement posture and relative angles of 24 joints of the human body. Quantities of specific parameters mentioned above are for examples only and may be increased or decreased according to actual situations. The generated SMPL human body model is shown in FIG. 10, and the model shown in FIG. 10 may be a model with color information. For simplicity, color information is not shown in FIG. 10. When generating the SMPL human body model, the body shape parameters in the body feature parameters are ShapeBlendPose parameters.

In another exemplary implementation mode, in the aforementioned act S102, generating the three-dimensional body model may include acquiring body feature parameters provided by a user, and generating the three-dimensional body model based on the body feature parameters. Among them, the body feature parameters may include body shape parameters and body posture parameters, and the body feature parameters may be provided by the user in advance and stored in a current device, or may be provided by the user in real time.

The three-dimensional body model generated based on the body feature parameters provided by the user may meet personalized modeling needs of the full-body or body parts.

In an exemplary implementation mode, the generating the three-dimensional body model based on the body feature parameters may include: performing deformation processing on a base body model based on the body feature parameters to obtain a processed base body model as the three-dimensional body model. The base body model may be acquired in advance and stored in the current device, or may be acquired in real time, in one example, the base body model may be a three-dimensional body model with skin weights, When generating the three-dimensional body model, the body shape parameters in the body feature parameters may control change of a human body shape through an incremental template, the incremental template may include a correlation relationship between the body shape parameters and model shape coefficients, and the correlation relationship may be expressed as follows.

$$M[f_1, f_2, \ldots, f_k, 1]^T = b \qquad \text{Expression (5)}$$

In the Expression (5), $f_1, f_2, \ldots, f_k$ denote k body shape parameters, b denotes a model shape coefficient, and M denotes a transformation matrix. The transformation matrix M may be determined through a following manner: inputting a large amount of sample data of body shape parameters and shape coefficients, and obtaining a value of each element in the transformation matrix M by solving a system of linear equations. After the aforementioned correlation relationship is determined, the model shape coefficient b may be determined by substituting the body shape parameters acquired based on the human body image or the body shape parameters provided by the user into the Expression (5).

Based on the model shape coefficient b, deformation processing may be performed on the base body model with reference to a deformation formula obtained by principal component analysis. A principle of the principal component analysis is as follows.

Assuming that there are m three-dimensional body models in a body model database as samples for principal component analysis, and each sample contains n three-dimensional vertices, each sample is first represented by a column vector of a coordinate set of n three-dimensional vertices as follows.

$$X_i = [x_1^i, y_1^i, z_1^i, x_2^i, y_2^i, z_2^i, \ldots, x_n^i, y_n^i, z_n^i]^T \qquad \text{Expression (6)}$$

In the Expression (6), i denotes a sample number, $X_i$ denotes an i-th sample, $x_1^i, y_1^i, z_1^i$ denotes a coordinate of a first three-dimensional vertex of the i-th sample, $x_2^i, y_2^i, z_2^i$ denotes a coordinate of a second three-dimensional vertex of the i-th sample, and $x_n^i, y_n^i, z_n^i$ denotes a coordinate of an n-th three-dimensional vertex of the i-th sample.

Then an average shape vector of all samples is calculated as follows.

$$\overline{X} = \frac{1}{m}\sum\nolimits_{i=1}^{m}X_i \qquad \text{Expression (7)}$$

In an exemplary implementation mode, a covariance matrix of each sample may be calculated as follows.

$$S = \frac{1}{m-1}\sum\nolimits_{i=1}^{m}(X_i - \overline{X})^T \cdot (X_i - \overline{X}) \qquad \text{Expression (8)}$$

Furthermore, a main deformation component (eigenvector) $\phi_m$ and its corresponding deformation eigenvalue $\lambda_m$ of the covariance matrix S may be obtained through Singular Value Decomposition (SVD), the main deformation component (eigenvector) $\phi_m$ and its corresponding deformation eigenvalue $\lambda_m$ may retain main data information of original m samples to a relatively large extent to reflect deformation features of the original m samples, and irrelevant or repeated data information is delete to reduce an amount of calculation.

All the obtained deformation eigenvalues are sorted in an order from large to small, and first c deformation eigenvalues $\lambda$m with a largest value are selected as estimation of all shapes of samples as a whole. A shape of each human body may be expressed as follows.

$$X = \overline{X} + \sum\nolimits_{m=1}^{C}b_m\phi_m \qquad \text{Expression (9)}$$

In the Expression (9), $b_m$ represents a shape coefficient, that is, the model shape coefficient b in the Expression (5), this coefficient may be regarded as a compressed expression of a shape of a sample. The shape coefficient may be determined according to a deformation eigenvalue, and the Expression (9) is a deformation formula. Parameters of the base body model are substituted into $\overline{X}$, and the model shape coefficient b determined in the Expression (5) is substituted into $b_m$, and a deformation result may be obtained.

A plurality of three-dimensional body models in the body model database may be produced through an art engine, and the model shape coefficient determined based on the three-dimensional body models is more in line with actual needs of a user; the plurality of three-dimensional body models of the body model database may be constructed based on statistical data.

In an exemplary implementation mode, the base body model may be a three-dimensional body model made by a user through an art engine. For example, it may be a three-dimensional body model made through the art engine for games, medical health, and other fields. Similar to production of the base facial models, base body models that meet business needs of different fields may be provided aiming for characteristics of different fields, thus a server side may carry out the aforementioned deformation processing on a basis of the provided base body models, different base body models may be provided aiming for different fields, and a server may carry out the aforementioned deformation processing on a basis of different base body models, so that the deformed base body models are in line with basic needs of relevant fields and also embody characteristics of an original human body image, with relatively high adaptability to different fields and relatively wide application range.

A body model database including a plurality of three-dimensional body models may be made through an art engine, and the above base body model may be a model in the body model database or an average model of each three-dimensional body model in the body model database (e.g., $\overline{X}$ in the Expression (7)).

In an exemplary implementation mode, in the above act S104, the splicing the second three-dimensional facial model and the three-dimensional body model may include: bonding the second three-dimensional facial model and the three-dimensional body model through an animated skeleton system, for example, setting up an animated skeleton system, bonding the second three-dimensional facial model and the three-dimensional body model to corresponding parts of the animated skeleton system, so that the second three-dimensional facial model and the three-dimensional body model may be spliced into a whole three-dimensional human body model.

In one example, an animated skeleton system may be set, the animated skeleton system may include skeleton points of a full-body from a face to a body, and each of the skeleton points may be expressed in a form of a three-dimensional coordinate. The skeleton points may be used for guiding movements of a model, for example, controlling and transforming movements of the model based on the skeleton points. Skeleton points of different parts may be used for guiding movements of different parts of the model, for example, facial skeleton points may be used for specifying movements of a face of the model, and body skeleton points may be used v movements of body parts of the model.

In one example, a second three-dimensional facial model may be bound to facial skeleton points in an animated skeleton system, for example, a matching relationship between facial feature points of the second three-dimensional facial model and the facial skeleton points may be established, the facial feature points of the second three-dimensional facial model are bound to matched facial skeleton points, and further, the entire second three-dimensional facial model may be bound to the facial skeleton points. When establishing the matching relationship between the facial feature points of the second three-dimensional facial model and the facial skeleton points, three-dimensional coordinates of the facial feature points and three-dimensional coordinates of the facial skeleton points may be matched in a same coordinate system. For example, if a difference between a three-dimensional coordinate of a facial feature point and a three-dimensional coordinate of a facial skeleton point is below a preset threshold, the corresponding facial feature point and the facial skeleton point may be considered to be matched.

In one example, when the three-dimensional body model is a full-body model, the three-dimensional body model may be bound to full-body skeleton points in an animated skeleton system. For example, a matching relationship between body feature points of the three-dimensional body model and the full-body skeleton points may be established, the body feature points of the three-dimensional body model are bound to matched full-body skeleton points, and further, the entire three-dimensional body model may be bound to the full-body skeleton points. Herein, the body feature points may be three-dimensional vertices used for characterizing key parts of a full-body, and the body feature points may include facial feature points. When the three-dimensional body model is a full-body model, the three-dimensional body model may be first bound to full-body skeleton points, and then the second three-dimensional facial model is bound to facial skeleton points, and thus a facial part of the bound three-dimensional body model may be replaced by the second three-dimensional facial model.

In another example, when the three-dimensional body model is a model of body parts below a face, the three-dimensional body model may be bound to body skeleton points (i.e., skeleton points other than facial skeleton points) in an animated skeleton system. For example, a matching relationship between body feature points of the three-dimensional body model and the body skeleton points may be established, the body feature points of the three-dimensional body model may be bound to matched body skeleton points, and further, the entire three-dimensional body model may be bound to the body skeleton points. Herein, the body feature points may be three-dimensional vertices used for characterizing key parts of body parts below the face, such as three-dimensional vertices of arms, legs, hands, and the like, and the body feature points do not include facial feature points.

A specific manner of establishing the matching relationship between the body feature points and the full-body skeleton points (or the body skeleton points) may refer to a manner of establishing the matching relationship between the facial feature points and the facial skeleton points, replacing the facial feature points with the body feature points, and replacing the facial skeleton points with the full-body skeleton points or the body skeleton points.

Figure 11:
FIG. 11 is a partial schematic diagram of a three-dimensional human body model in an embodiment of the present disclosure.

The three-dimensional human body model bound in the above manner are shown in FIG. 11. In order to show an effect of a splicing process more clearly, only an upper half of the three human body model is shown in FIG. 11, and a lower half and color information are omitted.

In an exemplary implementation mode, the model reconstruction method provided by the embodiment of the present disclosure may further include: transmitting a spliced three-dimensional human body model to a 3D engine on a model processing device. That is, the three-dimensional human body model constructed by the model reconstruction method provided by the embodiment of the present disclosure may be directly interacted with the 3D engine, which is convenient for a user to carry out animation editing through the 3D engine.

In an exemplary implementation mode, the model reconstruction method provided by the embodiment of the present disclosure may further include: performing animation editing on the spliced three-dimensional human body model. A more realistic virtual image may be obtained after animation editing.

In an exemplary implementation mode, the performing animation editing on the spliced three-dimensional human body model may include: adjusting light reflection information of at least one splice point in a first splice point and a second splice point so that light reflection information of the first splice point is consistent with light reflection information of the second splice point. Herein, the first splice point is a splice point belonging to the second three-dimensional facial model at a splice place of the second three-dimensional facial model and the three-dimensional body model, and the second splice point is a splice point belonging to the three-dimensional body model at the splice place, and a splice point represents a three-dimensional vertex that may achieve splice between the second three-dimensional facial model and the three-dimensional body model.

At the splice place of the spliced three-dimensional human body model, there may be a relatively large differ-ence between the light reflection information of the first splice point and the light reflection information of the second splice point, which resulting in existence of a seam at the splice place. If the three-dimensional human body model with the seam is directly sent to an application end as a virtual image for display, an obvious black line will be seen visually, thus affecting a display effect. By adjusting light reflection information, the light reflection information of the first splice point and the light reflection information of the second splice point may be kept consistent, so as to reduce or eliminate the seam at the splice place, weaken or elimi-nate the black line visually, and thus improve a subsequent display effect.

In the embodiment of the present disclosure, the light reflection information of the first splice point and the light reflection information of the second splice point are consis-tent, which may include a following case: the light reflection information of the first splice point and the light reflection information of the second splice point are identical, or the light reflection information of the first splice point and the light reflection information of the second splice point have a difference within an allowable error range. The allowable error range may be set according to an actual demand.

The above light reflection information may include at least one piece of normal line information, color informa-tion, and highlight information. Adjustment of any kind of information may reduce the seam at the splice place to a certain extent, and adjustment of three kinds of information may reduce or eliminate the seam at the splice place greatly. The normal line information may include a direction and a size of a normal line as a vector, the size of the normal line may be contained in one normal line map, the color infor-mation may be contained in a color map, and the highlight information may be contained in a highlight map.

An embodiment of the present disclosure also provides a model processing method, which may be applied to a model processing device. The method includes: performing anima-tion editing on a three-dimensional human body model. Animation editing may get more realistic virtual images. Herein, the three-dimensional human body model may be reconstructed by the model reconstruction method provided by the embodiment of the present disclosure, for example, it may be the spliced three-dimensional human body model described above.

In one example, animation editing may be performed according to editing instructions entered by a user, or animation editing may be performed according to preset editing rules.

The model processing device may be a device of an application end, that is, a device that may be directly operated by a user, thus animation editing may be executed at the application end. Compared with a manner of perform-ing animation editing at a server end, a virtual image obtained after animation editing at the application end may be displayed at the application end, and it is not necessary to obtain an edited virtual image from the server end, and thus an error generated in a process of transmitting the edited virtual image by the server end may be avoided.

For example, when the server end transmits the three-dimensional human body model to the application end, it is usually necessary to convert data of the three-dimensional human body model from a form of floating-point data to a form of textual data and then transmit it. In a process of converting the form of floating-point data to the form of textual data, there will be an error, and the error will be transmitted to the application end. In addition, there will be an error in a coordinate origin of the three-dimensional human body model on the server end, and the error will also be transmitted to the application end. When the application end performs animation editing on the three-dimensional human body model from the server end, an error introduced in a process of transmission may be corrected, thus an influence of the error on a display effect may be reduced.

The three-dimensional human body model may include a three-dimensional facial model and a three-dimensional body model, such as the second three-dimensional facial model and the three-dimensional body model that are generated in the model reconstruction method provided by the embodiment of the present disclosure. Correspondingly, the performing animation editing on the three-dimensional human body model may include: adjusting light reflection information of at least one splice point in a first splice point and a second splice point so that light reflection information of the first splice point is consistent with light reflection information of the second splice point. Herein, the first splice point may be a splice point belonging to the three-dimensional facial model at a splice place of the three-dimensional facial model and the three-dimensional body model, and the second splice point may be a splice point belonging to the three-dimensional body model at the splice place of the three-dimensional facial model and the three-dimensional body model, and a splice point represents a three-dimensional vertex that may achieve splice between the three-dimensional facial model and the three-dimensional body model.

At the splice place of the three-dimensional human body model reconstructed by the aforementioned model reconstruction method, i.e., the aforementioned spliced three-dimensional human body model, there may be a relatively large difference between the light reflection information of the first splice point and the light reflection information of the second splice point, which leads to a seam at the splice place. If the three-dimensional human body model with the seam is directly displayed as a virtual image, an obvious black line will be seen visually, thus affecting a display effect. By adjusting light reflection information, the light reflection information of the first splice point and the light reflection information of the second splice point may be kept consistent, so as to reduce or eliminate the seam at the splice place, weaken or eliminate the black line visually, and thus improve the display effect.

In the embodiment of the present disclosure, the light reflection information of the first splice point and the light reflection information of the second splice point are consistent, which may include a following case: the light reflection information of the first splice point and the light reflection information of the second splice point are identical, or the light reflection information of the first splice point and the light reflection information of the second splice point have a difference within an allowable error range. The allowable error range may be set according to an actual demand.

The above light reflection information may include at least one of normal line information, color information, and highlight information. Adjustment of any one kind of information may reduce the seam at the splice place to a certain extent, and adjustment of three kinds of information may reduce or eliminate the seam at the splice place greatly. The normal line information may include a direction and a size of a normal line as a vector, the size of the normal line may be contained in a normal line map, the color information may be contained in a color map, and the highlight information may be contained in a highlight map.

In an implementation mode, performing animation editing of the three-dimensional human body model on a basis of the three-dimensional human body model generated by the model reconstruction method provided by the embodiment of the present disclosure or on a basis of the three-dimensional human body model after adjusting light reflection information, may include: generating a two-dimensional black-and-white control chart in response to a received control chart generation instruction, wherein the black-and-white control chart may include position information of each three-dimensional vertex in a region designated by the control chart generation instruction and controlled information used for characterizing whether each three-dimensional vertex in the region is controlled; attaching the black-and-white control chart to the region designated by the black-and-white control chart generation instruction in the three-dimensional human body model; determining controlled vertices of the three-dimensional human body model according to the controlled information in the black-and-white control chart; performing deformation processing on the controlled vertices in response to a received deformation instruction.

The above-mentioned black-and-white control chart generation instruction may be a drawing instruction for a user to draw a black-and-white control chart through a 3D engine, such as a drawing instruction for the user to draw the black-and-white control chart through a brush in the 3D engine. When a black-and-white control chart is continuously drawn, continuous drawing instructions may be generated, that is, continuous black-and-white control chart generation instructions. The black-and-white control chart generation instruction may include a region of a three-dimensional human body model specified by a user, such as a face and a neck, thus a generated black-and-white control chart may be a black-and-white control chart corresponding to the region, such as a black-and-white control chart of the face and neck shown in FIG. 12, and a three-dimensional vertex in the black-and-white control chart is a three-dimensional vertex of the region.

Figure 12:
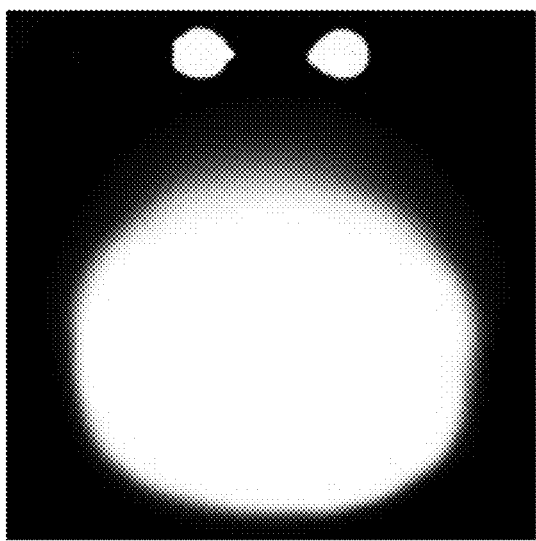
FIG. 12 is a schematic diagram of a black-and-white control chart in an embodiment of the present disclosure.

Referring to an example of FIG. 12, the controlled information used for characterizing whether each three-dimensional vertex is controlled in the black-and-white control chart may be represented in three colors: black, white, and gray. Black may represent that a corresponding three-dimensional vertex is uncontrolled and is an uncontrolled vertex, white may represent that a corresponding three-dimensional vertex is controlled and is a controlled vertex, and gray may serve as a transition color between black and white, and its gray value range may be 0 to 255. A three-dimensional vertex within a first gray value range may be set as a controlled vertex, a three-dimensional vertex within a second gray value range may be set as an uncontrolled vertex, and the first gray value range may be larger than the second gray value range. In the black-and-white control chart shown in FIG. 12, the more uniform the gray transition is, the more even the deformation processing is, and uniformity of a gray transition region may be set according to an actual demand.

The black and white control chart is a form of map that may be easily implemented by a 3D engine, which facilitates intervention of a user (e.g., an art producer of a game developer). For example, the user may brush the black-and-white control chart on a three-dimensional human body model through a 3D engine. In a process of brushing the black-and-white control chart, the user may specify a region range for controlling the three-dimensional human body model, and then perform optimization processing on the three-dimensional human body model through the black-and-white control chart, which may improve interactivity and meet personalized editing needs of the user, and is more operable for the user. For example, if the user is not satisfied with a shape of a three-dimensional human body model provided by a server end, the user may brush a black-and-white control chart through a 3D engine, and further perform deformation processing on the three-dimensional human body model based on the black-and-white control chart to meet his or her needs. In addition, the black-and-white control chart may be stored in an application end, which is convenient for subsequent recall. During a recall process, a user may adjust information of the black-and-white control chart to meet new processing requirements.

Figure 13:
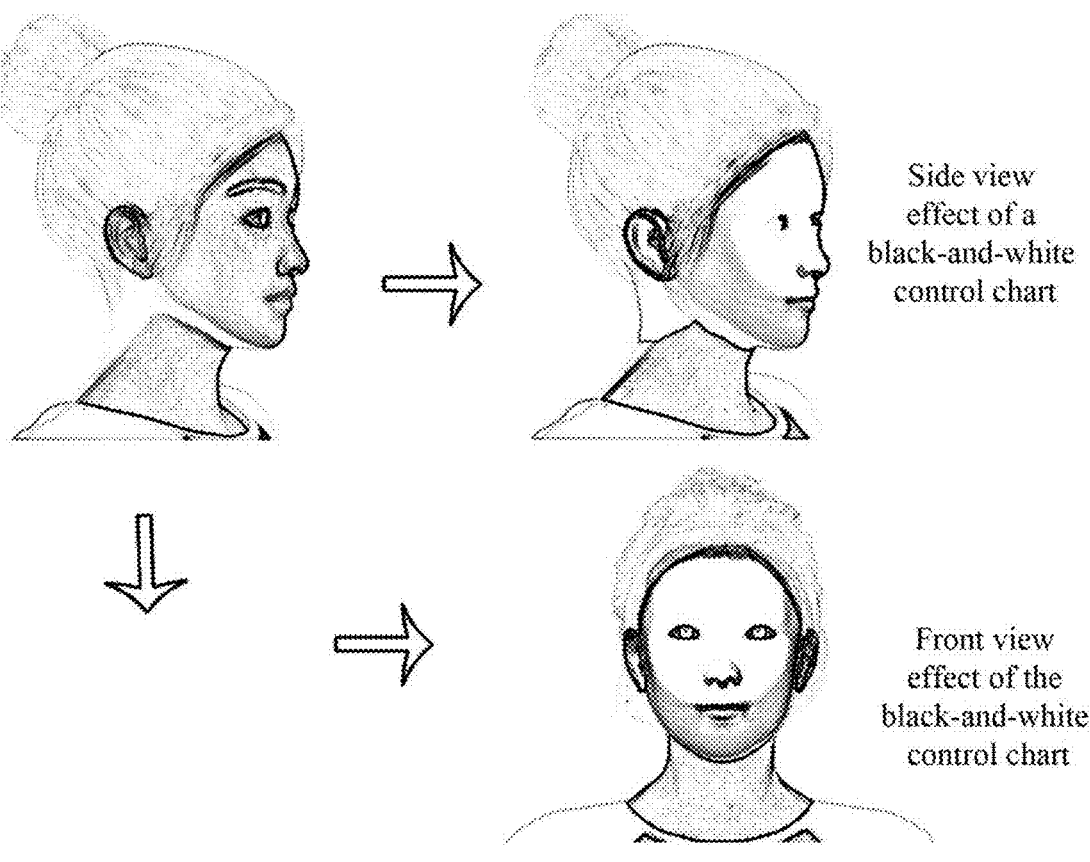
FIG. 13 is a schematic diagram of attaching a black-and-white control chart to a three-dimensional human body model in an embodiment of the present disclosure.

In the above editing solution based on the black-and-white control chart, the black-and-white control chart is attached to a region in the three-dimensional human body model designated by a black-and-white control chart generation instruction, so that controlled information in the black-and-white control chart may be transmitted to color information of each vertex of the region. FIG. 13 shows a schematic diagram of attaching the black-and-white control chart shown in FIG. 12 to the three-dimensional human body model. For concise representation, only a part of the three-dimensional human body model that needs to be attached is shown in FIG. 13, and remaining parts and part of color information are omitted. The controlled information may be read when the color information is read, thus a controlled vertex of the three-dimensional human body model may be determined, and then controlled vertex is processed in response to a processing instruction input by a user.

In an implementation mode, in the model processing method provided by the embodiment of the present disclosure, when animation editing of the three-dimensional human body model is completed to obtain an edited virtual image, the virtual image may be outputted, for example, the virtual image is displayed through a display apparatus.

Figure 14:
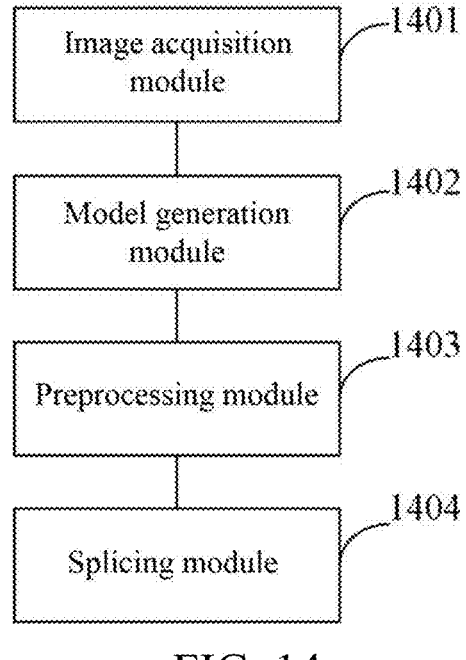
FIG. 14 is a schematic diagram of a structural framework of a model reconstruction apparatus provided by an embodiment of the present disclosure.

An embodiment of the present disclosure also provides a model reconstruction apparatus, and as shown in FIG. 14, the apparatus includes an image acquisition module 1401, a model generation module 1402, a preprocessing module 1403, and a splicing module 1404. Or, the apparatus includes at least one processor, and the processor is configured to execute these modules.

Among them, the image acquisition module 1401 is configured to acquire a human body image.

The model generation module 1402 is configured to generate a first three-dimensional facial model based on a first partial image in the human body image and generate a three-dimensional body model; the first partial image includes facial features.

The preprocessing module 1403 is configured to preprocess the first three-dimensional facial model and obtain a second three-dimensional facial model based on a preprocessing result.

The splicing module 1404 is configured to splice the second three-dimensional facial model and the three-dimensional body model to obtain a spliced three-dimensional body model.

In an exemplary implementation mode, when generating the first three-dimensional facial model based on the first partial image of the human body image, the above model generation module 1402 may be configured to extract facial feature parameters in the first partial image through a pre-trained neural network and generate the first three-dimensional facial model based on the facial feature parameters. Herein, the facial feature parameters may include facial shape parameters and facial expression parameters.

In an exemplary implementation mode, the pre-processing module 1403 may be configured to identify first facial feature points in the first three-dimensional facial model; and perform deformation processing on a base facial model based on the first facial feature points and obtain the second three-dimensional facial model based on a result of the deformation processing. Herein, the base facial model is a three-dimensional facial model with skin weights.

In an exemplary implementation mode, when performing deformation processing on the base facial model based on the first facial feature points and obtaining the second three-dimensional facial model based on the result of the deformation processing, the preprocessing module 1403 may be configured to: acquire information of second facial feature points in the base facial model; determine a correlation relationship between the first facial feature points and the second facial feature points; and adjust positions of the second facial feature points based on information of the first facial feature points and the correlation relationship, so that adjusted positions of the second facial feature points are consistent with positions of the first facial feature points. The second three-dimensional facial model may be an adjusted base facial model.

In an exemplary implementation mode, the second facial feature points may be discrete points; correspondingly, the above model processing module 1403 may also be configured to: perform smooth interpolation between each second facial feature point to obtain an interpolation result of a three-dimensional vertex between each second facial feature point; and adjust a position of the three-dimensional vertex based on the interpolation result.

In an exemplary implementation mode, the base facial model may be a three-dimensional facial model made by a user through an art engine.

In an exemplary implementation mode, the above model reconstruction apparatus may further include a map module. Or, the at least one processor may be further configured to execute a map module, and the map module may be configured to generate a facial map based on the first partial image, and attach the facial map to the second three-dimensional facial model.

In an exemplary implementation mode, the above map module may be configured to generate a first initial facial map based on the first partial image; and perform non-actinic processing on the initial facial map to remove illumination information in the initial facial map to obtain a processed facial map.

In an exemplary implementation mode, when generating the three-dimensional body model, the above model generation module 1402 may be configured to extract body feature parameters in a second partial image in the human body image through a pre-trained neural network, and generate the three-dimensional body model based on the body feature parameters. Herein, the second partial image may include full-body features or body features, and the body feature parameters may include body shape parameters and body posture parameters.

In another exemplary implementation mode, when generating the three-dimensional body model, the above model generation module 1402 may be configured to acquire body feature parameters provided by a user, and generate the three-dimensional body model based on the body feature parameters. Herein, the body feature parameters may include body shape parameters and body posture parameters.

In an exemplary implementation mode, when generating the three-dimensional body model based on the body feature parameters, the above model generation module 1402 may be configured to perform deformation processing on a preset base body model based on the body feature parameters to obtain a processed base body model as the three-dimensional body model.

In an exemplary implementation mode, the base body model may be a three-dimensional body model made by a user through an art engine.

In an exemplary implementation mode, the above facial features may include anatomical structural features and in vitro structural features of a face, the above body features may include anatomical structural features and in vitro structural features of body parts.

In an exemplary implementation mode, the above splicing module 1404 may be configured to bond the second three-dimensional facial model and the three-dimensional body model through an animated skeleton.

In an exemplary implementation mode, the above model reconstruction apparatus may further include a communication module that may be configured to transmit the three-dimensional human body model to a 3D engine on a model processing device.

In an exemplary implementation mode, the above model reconstruction apparatus may further include an animation editing module. Or, the at least one processor may be further configured to execute an animation editing module, and the animation editing module may be configured to perform animation editing on the three-dimensional human body model.

In an exemplary implementation mode, the animation editing module may be configured to adjust light reflection information of at least one of a first splice point and a second splice point so that light reflection information of the first splice point is consistent with light reflection information of the second splice point. Herein, the first splice point is a splice point belonging to the second three-dimensional facial model at a splice place of the second three-dimensional facial model and the three-dimensional body model, and the second splice point is a splice point belonging to the three-dimensional body model at the splice place.

An embodiment of the present disclosure also provides a model processing apparatus, which includes any model reconstruction apparatus described above, wherein, the at least one processor may further be configured to execute an animation editing module, and the animation editing module is configured to perform animation editing on a three-dimensional human body model.

In an exemplary implementation mode, the three-dimensional human body model may include a three-dimensional facial model and a three-dimensional body model. Correspondingly, the animation editing module may be configured to adjust light reflection information of at least one of a first splice point and a second splice point so that light reflection information of the first splice point is consistent with light reflection information of the second splice point. Herein, the first splice point is a splice point belonging to the three-dimensional facial model at a splice place of the three-dimensional facial model and the three-dimensional body model, and the second splice point is a splice point belonging to the three-dimensional body model at the splice place.

In an exemplary implementation mode, the animation editing module may be configured to generate a two-dimensional black-and-white control chart in response to a received control chart generation instruction, the black-and-white control chart may include position information of each three-dimensional vertex in a region designated by the control chart generation instruction and controlled information for characterizing whether each three-dimensional vertex in the region is controlled; attach the black-and-white control chart to the region designated by the control chart generation instruction in the three-dimensional human body model; determine a controlled vertex of the three-dimensional human body model according to the controlled information in the black-and-white control chart; and process the controlled vertex in response to a received processing instruction.

Functions of modules in each apparatus of the embodiments of the present disclosure may refer to corresponding description in the aforementioned method embodiments and will not be repeated herein.

An embodiment of the present disclosure also provides an interactive system, which includes a model reconstruction device and a model processing device; the model processing device is communicatively connected with the model reconstruction device. The model processing device is provided with a 3D engine, and the model processing device executes any model processing method provided by the embodiments of the present disclosure by invoking the 3D engine.

The model reconstruction device may execute any model reconstruction method provided by the embodiment of the present disclosure to reconstruct a corresponding three-dimensional human body model based on a human body image, the model reconstruction device may interact with the 3D engine on the model processing device to transmit a reconstructed three-dimensional human body model to the 3D engine, and then the 3D engine may perform subsequent processing of animation editing on the three-dimensional human body model.

The model processing device may be used as an application end to interact with a user directly, and the user may control the 3D engine on the model processing device to perform animation editing and output of the three-dimensional human body model. The model reconstruction device may be used as a server end to ultimately obtain a complete three-dimensional human body model which matches at least part of human body features in the human body image by processing the human body image.

In one example, the above interactive system may further include a display apparatus through which the three-dimensional human body model output by the 3D engine may be displayed, the display apparatus may be independently disposed or may be integrated into the model processing device at the application end.

In one example, the above interactive system may further include an image acquisition apparatus, which may be configured to acquire and transmit a human body image to the above model reconstruction device, and a user may control the image acquisition device to acquire a corresponding image. The image acquisition apparatus may be independently disposed, or may be integrated into the model processing device at the application end, or may be integrated into another device at the application end.

Figure 15:
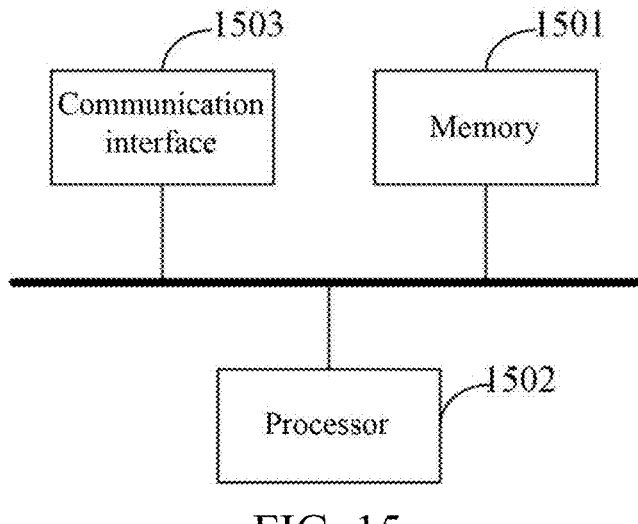
FIG. 15 is a schematic diagram of a structural framework of a model reconstruction device provided by an embodiment of the present disclosure.

Referring to FIG. 15, the above model reconstruction device includes a memory 1501 and a processor 1502. A computer program is stored in the memory 1501, and the computer program is loaded and executed by the processor 1502 to implement any model reconstruction method provided by the embodiment of the present disclosure. A quantity of the memory 1501 and the processor 1502 may be one or more.

In an exemplary implementation mode, the above model reconstruction device further includes: a communication interface 1503, which is configured to communicate with an external device and perform interactive data transmission.

If the memory 1501, the processor 1502, and the communication interface 1503 are implemented independently, the memory 1501, the processor 1502, and the communication interface 1503 may be connected with each other and complete communication with each other through a bus. The bus may be an Industry Standard Architecture (ISA) bus, a Peripheral Component Interconnect (PCI) bus, an Extended Industry Standard Architecture (EISA) bus, or the like. This bus may be categorized as an address bus, a data bus, a control bus, and so on. For convenience of representation, only one thick line is used for representation in FIG. 15, but it does not mean that there is only one bus or one type of bus.

In an exemplary implementation mode, if the memory 1501, the processor 1502, and the communication interface 1503 are integrated on a single chip, the memory 1501, the processor 1502, and the communication interface 1503 may communicate with each other through an internal interface.

Figure 16:
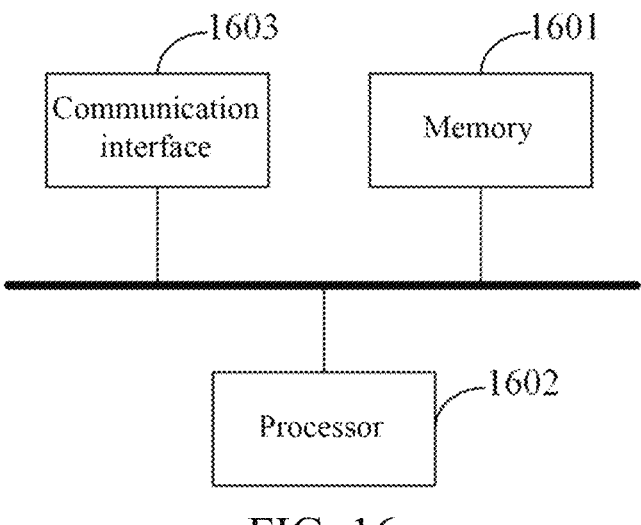
FIG. 16 is a schematic diagram of a structural framework of a model processing device provided by an embodiment of the present disclosure.

Referring to FIG. 16, the above model processing device includes a memory 1601 and a processor 1602. A computer program is stored in the memory 1601, and the computer program is loaded and executed by the processor 1602 to implement any model processing method provided by embodiment of the present disclosure. A quantity of the memory 1601 and the processor 1602 may be one or more.

In an exemplary implementation mode, the model processing device further includes: a communication interface 1603, which is configured to communicate with an external device and perform interactive data transmission.

If the memory 1601, the processor 1602, and the communication interface 1603 are implemented independently, the memory 1601, the processor 1602 and the communication interface 1603 may be connected with each other and complete communication with each other through a bus. The bus may be an Industry Standard Architecture (ISA) bus, a Peripheral Component Interconnect (PCI) bus, an Extended Industry Standard Architecture (EISA) bus, or the like. This bus may be categorized as an address bus, a data bus, a control bus, and so on. For convenience of representation, only one thick line is used for representation in FIG. 16, but it does not mean that there is only one bus or one type of bus.

In an exemplary implementation mode, if the memory 1601, the processor 1602, and the communication interface 1603 are integrated on a single chip, the memory 1601, the processor 1602, and the communication interface 1603 may communicate with each other through an internal interface.

An embodiment of the present disclosure also provides a non-transient computer-readable storage medium, which stores a computer program, when the computer program is executed by the processor, the model reconstruction method or the model processing method provided by any embodiment of the present disclosure is implemented.

An embodiment of the present disclosure also provides a chip including a processor, the processor is configured to call from a memory and run instructions stored in the memory, so that a communication device mounted with the chip executes the method provided by the embodiments of the present disclosure.

An embodiment of the present disclosure also provides a chip including an input interface, an output interface, a processor, and a memory, wherein the input interface, the output interface, the processor, and the memory are connected through an internal connection path, the processor is configured to execute codes in the memory, and when the codes are executed, the processor is configured to execute the method provided by the embodiments of the present disclosure.

In an exemplary implementation mode, the above processor may be a Central Processing Unit (CPU), and may be another general-purpose processor, a digital signal processor (DSP), an Application Specific Integrated Circuit (ASIC), a Field Programmable Gate Array (FPGA) or another programmable logic device, a discrete gate or a transistor logic device, a discrete hardware component, etc. The general-purpose processor may be a microprocessor, or any conventional processor, etc. It is worth noting that the processor may be a processor that supports Advanced RISC Machines (ARM) architecture.

In an exemplary implementation mode, the above memory may include a read-only memory and a random access memory, and may also include a non-volatile random access memory. The memory may be a volatile memory or a non-volatile memory, or may include both a volatile memory and a non-volatile memory. Herein, the non-volatile memory may include a Read-Only Memory (ROM), a Programmable ROM (PROM), an Erasable PROM (EPROM), an Electrically EPROM (EEPROM), or a flash memory. The volatile memory may include a Random Access Memory (RAM) that serves as an external cache. By way of illustration but not limitation, many forms of RAM are available, such as a Static RAM (SRAM), a Dynamic Random Access Memory (DRAM), a Synchronous DRAM (SDRAM), a Double Data Rate SDRAM (DDR SDRAM), an Enhanced SDRAM (ESDRAM), a Sync Link DRAM (SLDRAM), and a Direct Rambus RAM (DR RAM).

In the above embodiments, it may be implemented in whole or in part by software, hardware, firmware, or any combination thereof. When implemented in software, it may be implemented in whole or in part in a form of a computer program product. The computer program product includes one or more computer instructions. When computer program instructions are loaded and executed on a computer, processes or functions according to the present disclosure are generated in whole or in part. The computer may be a general-purpose computer, a special-purpose computer, a computer network, or another programmable apparatus. Computer instructions may be stored in a computer-readable storage medium or transmitted from one computer-readable storage medium to another.

In the description of this specification, descriptions with reference to terms "an embodiment", "some embodiments", "example", "specific example", or "some examples", etc. mean that features, structures, materials, or characteristics described in conjunction with the embodiment or example is included in at least one embodiment or example of the present disclosure. Moreover, described features, structures, materials, or characteristics may be combined in any one or more embodiments or examples in a suitable manner. In addition, those skilled in the art may combine different embodiments or examples described in the specification, and features of different embodiments or examples without contradicting each other.

In addition, terms "first" and "second" are used for descriptive purposes only and cannot be interpreted as indicating or implying relative importance or implicitly indicating a quantity of technical features indicated. Thus, features defined by "first" and "second" may explicitly or implicitly include at least one of the features. In the description of the present disclosure, a meaning of "a plurality of" is two or more than two, unless defined otherwise explicitly.

Any process or method description depicted in a flowchart or otherwise described herein may be understood to represent a module, a fragment, or a part of codes including one or more executable instructions used for implementing acts of a particular logical function or process. And a scope of a preferred embodiment of the present disclosure includes additional implementations in which functions may be performed out of an order shown or discussed, including functions are performed in a substantially simultaneous manner or in a reverse order, depending on functions involved.

Logics and/or acts represented in a flowchart or otherwise described herein, for example, may be considered to be an ordered list of executable instructions for implementing logical functions, and may be implemented in any computer-readable medium for use by an instruction execution system, apparatus, or device (such as a computer-based system, a system including a processor, or another system that may read and execute instructions from the instruction execution system, apparatus, or device), or for use in combination with such instruction execution system, apparatus, or device.

In an exemplary implementation mode, each part of the present disclosure may be implemented in hardware, software, firmware, or a combination thereof. In the above implementation mode, multiple acts or methods may be implemented through software or firmware stored in a memory and executed by a suitable instruction execution system. All or some of acts of methods of the above embodiments are accomplishable by instructing related hardware through a program, the program may be stored in a computer-readable storage medium, and when the program is executed, one of acts of the method embodiment or a combination thereof is included.

Those of ordinary skills in the art may understand that all or some of acts in the methods disclosed above, functional modules or units in systems and apparatuses may be implemented as software, firmware, hardware, and an appropriate combination thereof. In a hardware implementation mode, division between functional modules/units mentioned in the above description does not necessarily correspond to division of physical components. For example, a physical component may have multiple functions, or a function or an act may be performed by several physical components in cooperation. Some components or all components may be implemented as software executed by a processor such as a digital signal processor or a microprocessor, or implemented as hardware, or implemented as an integrated circuit such as a specific integrated circuit. Such software may be distributed on a computer-readable medium, and the computer-readable medium may include a computer storage medium (or a non-transitory medium) and a communication medium (or a transitory medium). As known to those of ordinary skills in the art, a term computer storage medium includes volatile and nonvolatile, and removable and irremovable media implemented in any method or technology for storing information (for example, a computer-readable instruction, a data structure, a program module, or other data). The computer storage medium includes, but is not limited to, a RAM, a ROM, an EEPROM, a flash memory or another memory technology, a CD-ROM, a Digital Versatile Disk (DVD) or another optical disk storage, a magnetic cartridge, a magnetic tape, magnetic disk storage or another magnetic storage apparatus, or any other medium that may be used for storing desired information and may be accessed by a computer. In addition, it is known to those of ordinary skills in the art that the communication medium usually includes a computer-readable instruction, a data structure, a program module, or other data in a modulated data signal of, such as, a carrier or another transmission mechanism, and may include any information delivery medium.

In addition, a plurality of functional units in the embodiment of the present disclosure may be integrated in one processing module, or each unit may exist separately physically, or two or more units may be integrated in one module.

The above integrated module may be implemented in a form of hardware, or may be implemented in a form of software function modules. The above integrated module may also be stored in a computer-readable storage medium if implemented in a form of a software function module and sold or used as an independent product. The storage medium may be a read-only memory, a magnet disk, or an optical disk, etc.

The above is only specific implementation modes of the present disclosure, but the protection scope of the present disclosure is not limited to this. Any person familiar with this technical field may easily conceive various variations or substitutions within the technical scope disclosed in the present disclosure, which should be covered within the protection scope of the present disclosure. Therefore, the protection scope of the present disclosure shall be subject to the protection scope of the claims.

The invention claimed is:

1. A model reconstruction method, comprising:
acquiring a human body image;
generating a first three-dimensional facial model based on a first partial image in the human body image and generating a three-dimensional body model; wherein the first partial image comprises facial features;
preprocessing the first three-dimensional facial model, and obtaining a second three-dimensional facial model based on a preprocessing result; and
splicing the second three-dimensional facial model and the three-dimensional body model to obtain a spliced three-dimensional human body model,
wherein the preprocessing the first three-dimensional facial model and obtaining the second three-dimensional facial model based on the preprocessing result comprises:
identifying first facial feature points in the first three-dimensional facial model; and
performing deformation processing on a base facial model based on the first facial feature points and obtaining the second three-dimensional facial model based on a result of the deformation processing; wherein the base facial model is a three-dimensional facial model with skin weights.

2. The model reconstruction method according to claim 1, wherein the generating the first three-dimensional facial model based on the first partial image in the human body image comprises:
extracting facial feature parameters in the first partial image through a pre-trained neural network; wherein the facial feature parameters comprise facial shape parameters and facial expression parameters; and
generating the first three-dimensional facial model based on the facial feature parameters.

3. The model reconstruction method according to claim 1, wherein the performing deformation processing on the base facial model based on the first facial feature points and obtaining the second three-dimensional facial model based on the result of the deformation processing comprises:
acquiring information of second facial feature points in the base facial model;
determining a correlation relationship between the first facial feature points and the second facial feature points; and
adjusting positions of the second facial feature points based on information of the first facial feature points and the correlation relationship, to enable adjusted positions of the second facial feature points to be consistent with positions of the first facial feature points; wherein the second three-dimensional facial model is an adjusted base facial model.

4. The model reconstruction method according to claim 3, wherein the second facial feature points are discrete points; the method further comprises:

performing smooth interpolation between each second facial feature point to obtain an interpolation result of a three-dimensional vertex between each second facial feature point; and adjusting a position of the three-dimensional vertex based on the interpolation result.

5. The model reconstruction method according to claim 1, further comprising:

generating a facial map based on the first partial image; and attaching the facial map to the second three-dimensional facial model.

6. The model reconstruction method according to claim 5, wherein the generating the facial map based on the first partial image comprises:

generating a first initial facial map based on the first partial image; and performing non-actinic processing on the initial facial map to remove illumination information in the initial facial map to obtain a processed facial map.

7. The model reconstruction method according to claim 1, wherein the generating the three-dimensional body model comprises:

extracting body feature parameters in a second partial image in the human body image through a pre-trained neural network; wherein the second partial image comprises full-body features or body features, and the body feature parameters comprise body shape parameters and body posture parameters; and generating the three-dimensional body model based on the body feature parameters;

or, the generating the three-dimensional body model comprises:

acquiring body feature parameters provided by a user; wherein the body feature parameters comprise body shape parameters and body posture parameters; and generating the three-dimensional body model based on the body feature parameters.

8. The model reconstruction method according to claim 7, wherein the generating the three-dimensional body model based on the body feature parameters comprises:

performing deformation processing on a base body model based on the body feature parameters to obtain a processed base body model as the three-dimensional body model.

9. The model reconstruction method according to claim 7, wherein, the facial features comprise anatomical structural features and in vitro structural features of a face;

the body features comprise anatomical structural features and in vitro structural features of body parts.

10. The model reconstruction method according to claim 1, wherein the splicing the second three-dimensional facial model and the three-dimensional body model comprises:

bonding the second three-dimensional facial model and the three-dimensional body model through an animated skeleton system.

11. The model reconstruction method according to claim 1, further comprising:

performing animation editing on the three-dimensional human body model.

12. The model reconstruction method according to claim 11, wherein the performing animation editing on the three-dimensional human body model comprises:

adjusting light reflection information of at least one of a first splice point and a second splice point to enable light reflection information of the first splice point to be consistent with light reflection information of the second splice point; wherein the first splice point is a splice point belonging to the second three-dimensional facial model at a splice place of the second three-dimensional facial model and the three-dimensional body model, and the second splice point is a splice point belonging to the three-dimensional body model at the splice place.

13. A model processing method, comprising:

performing animation editing on a three-dimensional human body model;

wherein the three-dimensional human body model is reconstructed by a model reconstruction method according to claim 1.

14. The model processing method according to claim 13, wherein the three-dimensional human body model comprises a three-dimensional facial model and a three-dimensional body model;

the performing animation editing on the three-dimensional human body model comprises:

adjusting light reflection information of at least one of a first splice point and a second splice point to enable light reflection information of the first splice point to be consistent with light reflection information of the second splice point; wherein the first splice point is a splice point belonging to the three-dimensional facial model at a splice place of the three-dimensional facial model and the three-dimensional body model, and the second splice point is a splice point belonging to the three-dimensional body model at the splice place;

or, the performing animation editing on the three-dimensional human body model comprises:

generating a two-dimensional black-and-white control chart in response to a received control chart generation instruction; wherein the black-and-white control chart comprises position information of each three-dimensional vertex in a region designated by the control chart generation instruction and controlled information for characterizing whether each three-dimensional vertex in the region is controlled;

attaching the black-and-white control chart to the region in the three-dimensional human body model;

determining a controlled vertex of the three-dimensional human body model according to the controlled information in the black-and-white control chart;

processing the controlled vertex in response to a received processing instruction.

15. A model reconstruction device, comprising a memory and a processor, wherein a computer program is stored in the memory, and the computer program is loaded and executed by the processor to implement a model reconstruction method according to claim 1.

16. A non-transitory computer-readable storage medium, on which a computer program is stored, wherein when the computer program is executed by a processor, a method according to claim 1 is implemented.

17. A model reconstruction apparatus, comprising at least one processor, wherein the processor is configured to execute an image acquisition module, a model generation module, a preprocessing module, and a splicing module, wherein:

the image acquisition module is configured to acquire a human body image;

the model generation module is configured to generate a first three-dimensional facial model based on a first partial image in the human body image and generate a three-dimensional body model; wherein the first partial image comprises facial features;

the preprocessing module is configured to preprocess the first three-dimensional facial model and obtain a second three-dimensional facial model based on a preprocessing result; and the splicing module is configured to splice the second three-dimensional facial model and the three-dimensional body model to obtain a spliced three-dimensional body model-, wherein the preprocessing module is further configured to identify first facial feature points in the first three-dimensional facial model; and perform deformation processing on a base facial model based on the first facial feature points and obtain the second three-dimensional facial model based on a result of the deformation processing, wherein the base facial model is a three-dimensional facial model with skin weights.

18. A model processing apparatus, comprising a model reconstruction apparatus according to claim 17, wherein the at least one processor is further configured to execute an animation editing module, wherein the animation editing module is configured to perform animation editing on a three-dimensional human body model.

19. An interactive system, comprising:

a model reconstruction device, wherein the model reconstruction device comprises a memory and a processor, a computer program is stored in the memory, and the computer program is loaded and executed by the processor to implement a following model reconstruction method: acquiring a human body image; generating a first three-dimensional facial model based on a first partial image in the human body image, and generating a three-dimensional body model, wherein the first partial image comprises facial features; preprocessing the first three-dimensional facial model and obtaining a second three-dimensional facial model based on a preprocessing result; and splicing the second three-dimensional facial model and the three-dimensional body model to obtain a spliced three-dimensional human body model, wherein the preprocessing the first three-dimensional facial model and obtaining the second three-dimensional facial model based on the preprocessing result comprises: identifying first facial feature points in the first three-dimensional facial model; and performing deformation processing on a base facial model based on the first facial feature points and obtaining the second three-dimensional facial model based on a result of the deformation processing; wherein the base facial model is a three-dimensional facial model with skin weights; and a model processing device, wherein the model processing device comprises a memory and a processor, a computer program is stored in the memory, and the computer program loaded and executed by the processor to implement a model processing method, and the model processing method comprises: performing animation editing on a three-dimensional human body model generated by the model reconstruction method;

wherein the model processing device is communicatively connected with the model reconstruction device;

the model processing device is provided with a three-dimensional engine, and the model processing device executes the model processing method by invoking the three-dimensional engine.

* * * * *